United States Patent
Brown et al.

(10) Patent No.: US 11,059,440 B2
(45) Date of Patent: Jul. 13, 2021

(54) SYSTEM AND METHOD FOR AUTOMATICALLY LEARNING AND RECALLING DRIVER PREFERENCES

(71) Applicant: Ford Global Technologies, LLC, Dearborn, MI (US)

(72) Inventors: Patrick Brown, Sewickley, PA (US); Justin Bauer, Plymouth, MI (US); Thomas Lee Miller, Ann Arbor, MI (US); Walter L. Stephens, Jr., Farmington Hills, MI (US); Sonya Golden, Dearborn, MI (US); Patrick Maloney, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 16/265,640

(22) Filed: Feb. 1, 2019

(65) Prior Publication Data
US 2020/0247337 A1    Aug. 6, 2020

(51) Int. Cl.
| | |
|---|---|
| *B60R 16/037* | (2006.01) |
| *G06N 20/00* | (2019.01) |
| *B60R 1/06* | (2006.01) |
| *B60T 7/04* | (2006.01) |
| *B60K 26/02* | (2006.01) |

(52) U.S. Cl.
CPC ........ *B60R 16/037* (2013.01); *G06N 20/00* (2019.01); *B60K 26/02* (2013.01); *B60K 2026/026* (2013.01); *B60R 1/06* (2013.01); *B60T 7/04* (2013.01)

(58) Field of Classification Search
CPC ........ B60R 16/037; B60R 1/06; G06N 20/00; B60K 26/02; B60K 2026/026; B60T 7/04
See application file for complete search history.

(56) References Cited

U.S. PATENT DOCUMENTS

| | | | |
|---|---|---|---|
| 6,665,600 B2 | 12/2003 | Miller et al. | |
| 6,675,082 B2 | 1/2004 | Galli et al. | |
| 6,759,943 B2 | 7/2004 | Lucy et al. | |
| 8,214,097 B2* | 7/2012 | Severinsky | ........... F01N 3/2013 701/22 |
| 8,977,408 B1* | 3/2015 | Cazanas | ................ B60R 16/037 701/2 |
| 10,785,308 B2* | 9/2020 | Asher | .................... B60R 16/037 |
| 2008/0195564 A1* | 8/2008 | Kojima | .............. B60H 1/00971 706/12 |
| 2009/0084623 A1* | 4/2009 | Dagenais | .............. B60W 30/02 180/210 |
| 2010/0082192 A1* | 4/2010 | Hofbauer | ................ B60L 50/16 701/22 |
| 2011/0204712 A1* | 8/2011 | Tarasinski | .............. A01B 59/06 307/9.1 |

(Continued)

*Primary Examiner* — Hussein Elchanti
(74) *Attorney, Agent, or Firm* — Frank Lollo; Eversheds Sutherland (US) LLP

(57) ABSTRACT

A vehicle for automatically learning and recalling driver preferences includes a subsystem and a processor. The processor builds, for a user profile, an ideal range in which the subsystem has been adjusted over key cycles. For each instance in which the user profile is loaded, the processor causes the subsystem to adjust to the latest saved user adjustment of the subsystem. The processor save the current user adjustment in response to the current user adjustment of the subsystem being within the ideal range.

24 Claims, 4 Drawing Sheets

(56) References Cited

U.S. PATENT DOCUMENTS

| | | | |
|---|---|---|---|
| 2014/0156129 A1* | 6/2014 | Tabata | B60W 20/00 |
| | | | 701/22 |
| 2014/0230785 A1* | 8/2014 | Kawaguchi | F02D 11/06 |
| | | | 123/349 |
| 2014/0306814 A1* | 10/2014 | Ricci | B60R 25/25 |
| | | | 340/425.5 |
| 2015/0197205 A1* | 7/2015 | Xiong | B60R 16/037 |
| | | | 701/49 |
| 2017/0120867 A1* | 5/2017 | Beauvais | B60R 25/24 |
| 2018/0170256 A1* | 6/2018 | Medenica | B60R 16/037 |

* cited by examiner

SYSTEM AND METHOD FOR AUTOMATICALLY LEARNING AND RECALLING DRIVER PREFERENCES

TECHNICAL FIELD

The present disclosure generally relates to a system and method for automatically learning and recalling driver preferences and, more specifically, a system and method for automatically learning driver preferences for adjusting vehicle subsystems over a plurality of key cycles and recalling driver preferences.

BACKGROUND

Vehicles include a convenience feature in which driver's preferences for adjusting settings of various vehicle features, such as seat settings, radio station preferences, temperature, steering wheel tilt, side view mirror angles, etc., are automatically loaded. While such feature may provide user convenience, it requires substantial effort from the users to familiarize themselves for learning the convenience feature. Therefore, there is a need for a seamless provision of driver preferences for vehicle settings.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle and method are described herein. The example vehicle includes a subsystem and a processor. The processor builds, for a user profile, an ideal range in which the subsystem has been adjusted over key cycles. For each instance in which the user profile is loaded, the processor causes the subsystem to adjust to the latest saved user adjustment of the subsystem. The processor saves the current user adjustment in response to the current user adjustment of the subsystem being within the ideal range.

The example method includes: building, for a user profile, an ideal range in which the adjustable vehicle subsystem has been adjusted over key cycles; for each instance in which the user profile is loaded, causing the adjustable vehicle subsystem to adjust to the latest saved user adjustment of the adjustable vehicle subsystem; and responsive to the current user adjustment of the adjustable vehicle subsystem being within the ideal range, saving the current user adjustment.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
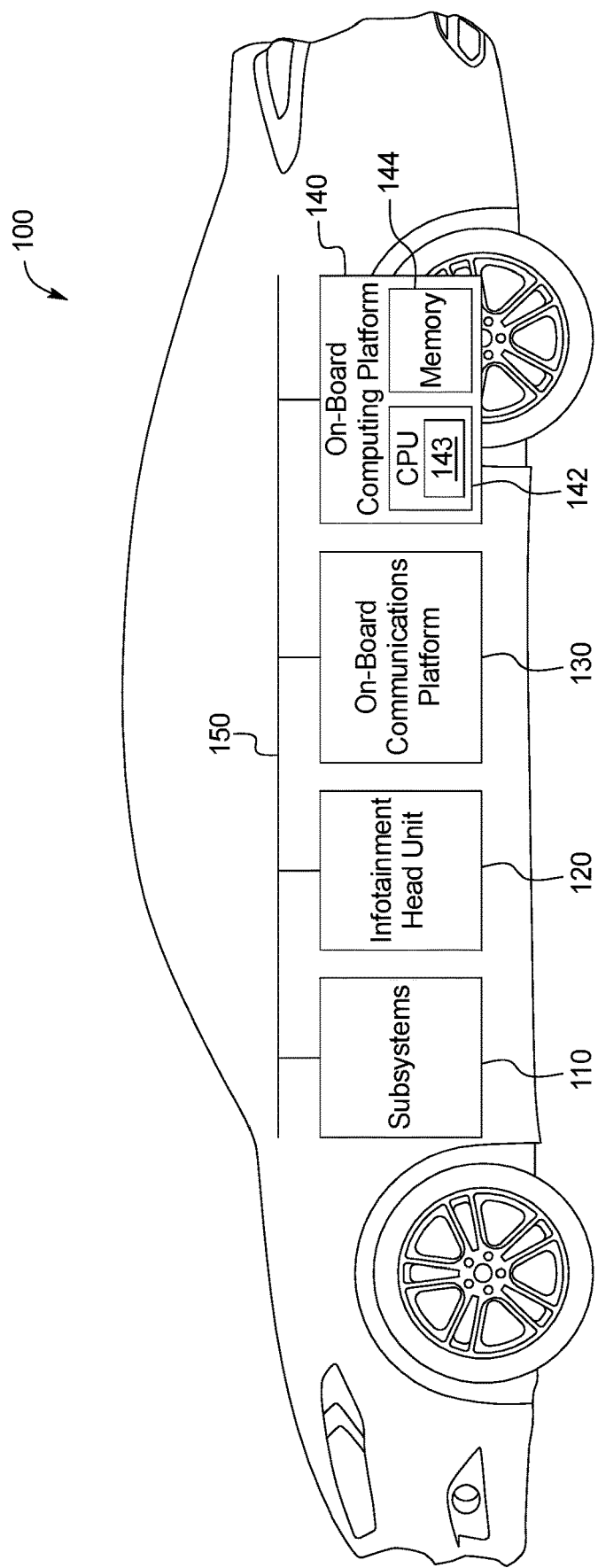
FIG. 1 illustrates a vehicle in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include features for saving and loading user preferences of vehicle settings, such as seat positions, mirror angles, steering wheel tilt, HUD position, AC speeds, etc. The user preferences are associated with a user profile such that the vehicle settings are automatically adjusted based on the user preferences when the user profiles are loaded. These vehicles may store multiple profiles for different drivers and load a profile corresponding to one of the drivers when a key fob of said driver is detected by said vehicles. While such vehicle features provide user convenience, the process for saving and loading the user preferences of the vehicle settings requires substantial effort from the user's end.

As disclosed below, a vehicle includes an auto-save system for: (1) automatically building an ideal range in which a vehicle setting is adjusted over a plurality of key cycles, wherein a key cycle refers to a period from a time point in which the ignition of the vehicle was turned on to a subsequent time point in which the ignition of the vehicle has turned off; (2) once the ideal range is established, determining whether the current user-adjustment of the vehicle setting is within the ideal range; (3) automatically saving the current user-adjustment of the vehicle setting when the vehicle setting is within the ideal range; (4) disabling auto-save of the current user-adjustment of the vehicle setting if said adjustment is outside the ideal range; (5) when the current user adjustment is outside the ideal range and the auto-save system receives a user input for saving the current user-adjustment, saving said adjustment and updating the ideal range to include said adjustment; and (6) for an instance in which the user's profile is loaded, loading latest saved user adjustment.

FIG. 1 illustrates a vehicle 100 in accordance with this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be a semi-autonomous vehicle (e.g., some routine motive functions, such as parking, are controlled by the vehicle 100), or an autonomous vehicle (e.g., motive functions are controlled by the vehicle 100 without direct driver input).

The vehicle 100 includes subsystems 110, an infotainment head unit 120, an on-board communications platform 130, and an on-board computing platform 140. These devices may be electrically and communicatively coupled with each other via a vehicle data bus 150. The vehicle data bus 150 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Herein, a vehicle subsystem 110 refers to one or more devices that are operable to provide a vehicle feature based on a user input. The vehicle subsystems 110 may include adjustable seats, adjustable side view mirrors, adjustable steering wheel, adjustable pedals (e.g., acceleration pedal, braking pedal, etc.), adjustable HUD, HVAC system, etc. The adjustable pedals may be configured to reposition with respect to a driver's seat to accommodate for the driver's height. Each of the plurality of vehicle subsystems 110 includes at least one feature that is adjustable over a range of degree. For example, the adjustable seat may be controlled to move horizontally within a range. In such example, the range is defined by a first position that is the closest to the steering wheel, a second position that the farthest from the steering wheel, and a plurality of positions in between the first position and the second position. Each of the plurality of subsystems 110 may be adjusted based on a command input via at least one user interface. For example, continuing with the example above, the user adjustable seat may include a control knob, a controller, and a motor operable to receive a user input and adjust the adjustable seat over the range based on the user input.

The infotainment head unit 120 provides an interface between the vehicle 100 and a user. The infotainment head unit 120 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 120 includes hardware (e.g., a processor or controller, memory, storage, etc.) and software (e.g., an operating system, etc.) for an infotainment system ZZZ (such as SYNC® and MyFord Touch® by Ford®, Entune® by Toyota®, IntelliLink® by GMC®, etc.). Additionally, the infotainment head unit 120 displays the infotainment system on, for example, the center console display.

The on-board communications platform 130 includes hardware and firmware to establish a connection with at least one mobile device. The on-board communications platform 130 may further include wired or wireless network interfaces to enable communication with external networks. The on-board communications platform 130 also includes hardware (e.g., processors, memory, storage, antenna, etc.) and software to control the wired or wireless network interfaces. In the illustrated example, the on-board communications platform 130 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 130 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The on-board computing platform 140 includes a processor or controller 142 and memory 144. In the illustrated example, the on-board computing platform 140 is structured to include an auto-save controller 143. Alternatively, in some examples, the auto-save controller 143 may be incorporated into another electronic control unit (ECU) with its own processor and memory. The processor or controller 142 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 144 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 144 includes multiple kinds of memory, particularly volatile memory and non-volatile memory.

The memory 144 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 144, the computer readable medium, and/or within the processor 142 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Figure 2:
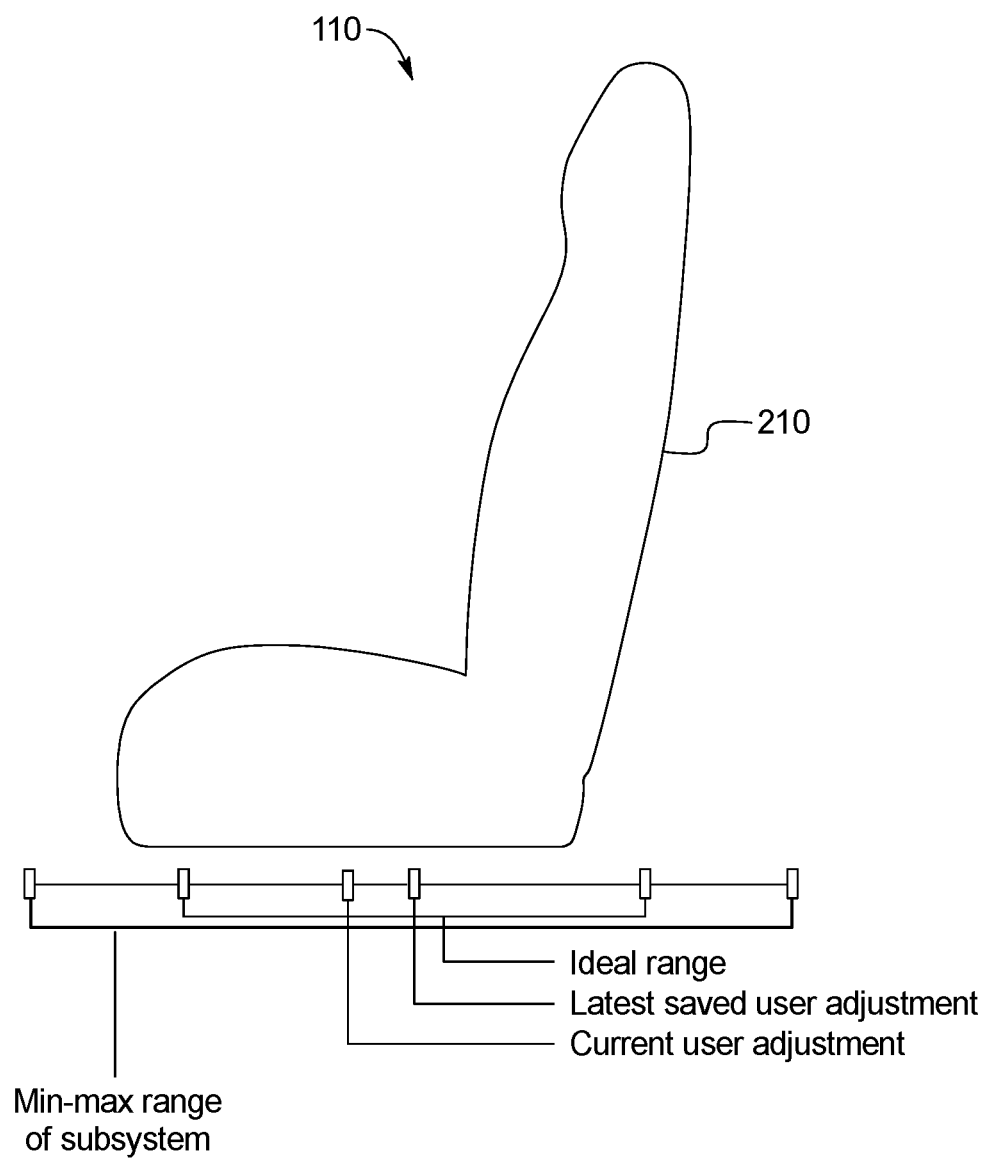
FIG. 2 illustrates an example subsystem of the vehicle 100 of FIG. 1.

FIG. 2 illustrates an example subsystem 110 of the vehicle 100 of FIG. 1. In FIG. 2, the example subsystem 110 is an adjustable vehicle seat 210. Herein, details of the auto-save controller 143 will be described with reference to FIG. 2

Operations of the auto-save controller 143 may be defined by a learning mode and an auto-save mode. During the learning mode, the auto-save controller 143 automatically tracks a range in which a setting of a particular vehicle subsystem is adjusted by the user over one or more learning periods. For instance, in an example scenario, it is assumed that the vehicle 100 is a newly purchased vehicle and has no previously stored data regarding user preferences for adjusting the driver's vehicle seat 210. It is further assumed that the driver's vehicle seat 210 is adjustable along a horizontal direction starting from a first position (the closest possible position to the steering wheel) to a tenth position (the tenth position being the farthest possible position from the steering wheel). Further, in this example scenario, the one or more learning period is defined as a plurality of key cycles. Over the plurality of key cycles, the auto-save controller 143 learns that the minimum to maximum range in which the user adjusts the driver's seat 210 is defined from the third position to the fifth position. Herein, a setting preference learned over the one or more learning periods will be referred as an ideal range. To establish the ideal range, the auto-save controller 143 may only record settings that have been set and used for more than a predetermined amount of time.

Once the ideal range is established, the auto-save controller 143 may operate in the auto-save mode. During the auto-save mode, the auto-save controller 143: (1) monitors whether the setting of the particular vehicle subsystem 110 is adjusted; (2) determines whether the current user-adjustment of the setting of the particular vehicle subsystem 110 is within the ideal range; (3) saves the current user-adjustment if the value of the current user-adjustment falls within the ideal range; (4) ignores the current user-adjustment if the value of the current user-adjustment falls outside the ideal range; and (5) loads the latest saved user adjustment for a subsequent key cycle or a subsequent instance in which the user's profile is loaded. For example, continuing from the example scenario above, the auto-save controller 143 determines that the current user-adjustment of the driver's seat is set to the third position. Since the third position is within the ideal range defined from the third position to the fifth position, the auto-save controller 143 saves the third position. Subsequent to saving the third position, it is assumed that the vehicle's ignition has restarted. In response, the auto-save controller 143 loads the user's profile and the latest saved user adjustment and causes the driver's seat to automatically adjust to the third position.

During the auto-save mode, when the current user-adjustment is outside the ideal range, and the user chooses to manually provide an input to save the current user-adjustment (e.g., via the infotainment head unit, a separate interface designated for adjusting the particular vehicle subsystem, etc.), the auto-save controller 143 saves the current user-adjustment and updates the ideal range by adding the value corresponding to the current user-adjustment. For example, continuing from the example scenario above, the user adjusts the vehicle seat to the seventh position and provides a manual input to save the current user-adjustment. In response, the auto-save controller 143 updates the ideal range to include positions from the third position to the seventh position.

In alternate examples, during the learning mode or when the ideal range is updated via the manual user input, the addition of the value of the current user-adjustment to the ideal range may not render values between the maximum or the minimum of the ideal range and said value of the current user-adjustment to be included in the updated ideal range. That is, while the ideal range provided in FIG. 2 may be continuous values, the ideal range may be discrete. For example, continuing from the example scenario above, if the user adjusts the vehicle seat to the seventh position and provides a manual input to save the current user-adjustment, the auto-save controller 143 may update the ideal range to include positions from the third position to fifth position and the seventh position.

The auto-save controller 143 may maintain a record of a plurality of profiles for the auto-save mode. A profile may include: (1) settings indicating whether a user wishes to use the auto-save mode; (2) settings indicating a degree of frequency and/or a level of detail in which the user of the profile wishes to receive assistance via the infotainment head unit for using the auto-save mode; and (3) for each of one or more settings of one or more vehicle subsystems: (a) the ideal range; and (b) the latest saved user adjustment. The profile may further include ideal ranges and the latest saved user adjustments for different types of vehicles. The auto-save controller 143 may distinguish the plurality of profiles and identity which one of the plurality of profiles is currently being used by the auto-save controller 143 by establishing a wireless communication between the on-board communication system 130 and a mobile device corresponding to said profile. That is, the mobile device of the user may function as an identifier for the user's profile. Alternatively, the vehicle may include at least one biometric sensor (not illustrated) and/or internal camera (not illustrated) to identify a user and determine the profile associated with the user. The profile setting and the preference as discussed above may be user accessible/adjustable via the user's mobile device, the infotainment head unit 120, personal computer (PC), etc.

In some examples, when the auto-save controller 143 determines that the current user adjustment is outside of the ideal range, the auto-save controller 143 may cause the infotainment head unit 120 or at least one vehicle user interface to display a message indicative of the current user adjustment being outside the ideal range and a prompt. The prompt may indicate whether the user wishes to save the current user adjustment and update the ideal range or adjust the setting of the particular vehicle subsystem without saving.

In some examples, during the auto-save mode, the auto-save controller 143 may not immediately render the determination of whether the current user-adjustment of the setting of the particular vehicle subsystem is within the ideal range. The auto-save controller 143 may include a timer that resets for each instance the setting of the particular vehicle subsystem is adjusted and perform said determination once the timer has lapsed. This ensures that the user of the vehicle is certain about his/her current adjustment of the setting.

In some examples, to promote safety and reduce distractions while the vehicle is being driven, the auto-save controller 143 may operate under the auto-save mode only when the gear of the vehicle is shifted to park.

In some examples, the auto-save controller 143 may disable the auto-save mode based on a determination of whether a mobile device of a driver of the vehicle 100 is authenticated for the auto-save mode. In such examples, the auto-save controller 143 may first determine whether a person accessing the vehicle is a driver. For example, the auto-save controller 143 may use a camera (not illustrated) disposed within the vehicle interior and/or a seat sensor (not illustrated) to detect a person in a driver's seat. In response, the auto-save controller may establish communication with any mobile device within the proximity of the driver's seat to determine whether said mobile device is authenticated for the activation of the auto-save mode. The auto-save controller may check with a database stored in memory 144 and/or an external database to verify whether the mobile device is associated with a profile for use in the auto-save mode. Based on the verification, if: (1) there is no profile associated with the mobile device; (2) the auto-save controller 143 fails to identify a profile associated with the mobile device; or (3) the setting of the user's profile has been previously set to disable the auto-save feature, the auto-save mode is disabled. In some examples, the auto-save mode may be disabled based on other conditions. For example, when: (1) a vehicle mode is in a factory mode; (2) the vehicle mode is in a transport mode; (3) the vehicle mode is a valet mode; (4) the vehicle mode is in an easy entry easy exit mode; or (5) when the user manually provides a manual input via the infotainment head unit 120 or another vehicle user interface to disable the auto-save mode, the auto-save mode may be disabled. The factory mode refers to a mode in which at least one function of the vehicle is disabled (e.g., starting the ignition). The vehicle may be in the factory mode when the vehicle is in undergoing a manufacturing process or the vehicle is being displayed at a dealership showroom. The transport mode refers to a mode in which the vehicle is being shipped (e.g., a tractor-trailer, a train, etc.). The valet mode refers to a mode in which at least one function of the vehicle is disabled (e.g., activation of the display device and/or a speaker of the infotainment head unit 120). The easy entry easy exit mode is a mode in which at least one vehicle seat is adjusted to provide a greater amount of space for the driver to enter or exit the vehicle.

Figure 3:
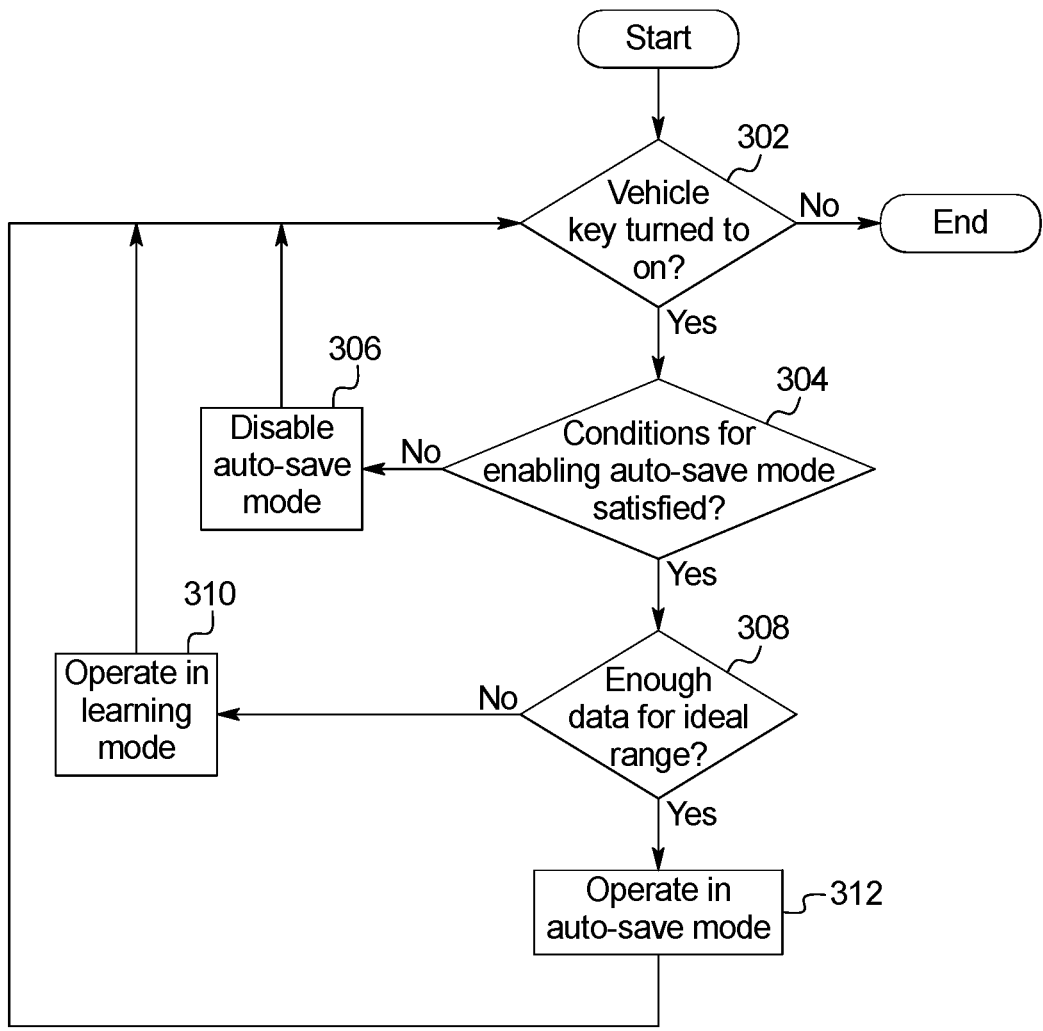
FIG. 3 is a flowchart of a method for operating an auto-save controller of the vehicle of FIG. 1.

FIG. 3 is a flowchart 300 of a method for operating the auto-save controller 143 of the vehicle 100 of FIG. 1.

At block 302, the auto-save controller 143 determines whether a vehicle key is switched to an on state. The on state refers to a state in which the vehicle is electrically powered, but not a state in which the ignition of the vehicle is turned on. If the vehicle utilizes a keyless system involving phone-as-a-key (PaaK), the auto-save controller 143 determines whether the vehicle is electrically powered. If the vehicle is in the on state, the method continues to block 304. Otherwise, the method terminates.

At block 304, the auto-save controller 143 determines whether a plurality of predetermined conditions for enabling the auto-save mode are satisfied. The auto-save controller 143 determines that the plurality of predetermined conditions are satisfied when: (1) the vehicle is not set to the transport mode; (2) the vehicle is not set to the valet mode; (3) the vehicle is not set to the easy entry easy exit mode; (4) the vehicle is parked; (5) the memory or an external database stores at least one profile that may be used for the auto-save mode; (6) a mobile device of a user within a vehicle is associated with a profile and is authenticated for use in auto-save mode; and (7) the user's profile indicate enablement of the auto-save mode. If all these conditions are satisfied, the method continues to block 414. Otherwise, the method continues to block 306 of FIG. 3.

At block 306, the auto-save controller 143 disables the auto-save mode.

At block 308, the auto-save controller 143 determines if an ideal range has been previously generated for a profile through multiple key cycles. If so, the method continues to block 310. Otherwise, the method continues to block 312.

At block 310, the auto-save controller 143 operates in the learning mode.

At block 312, the auto-save controller 143 operates in the auto-save mode. Details of operations under the auto-save mode will be describe in detail with reference to a flowchart of FIG. 4, below.

Figure 4:
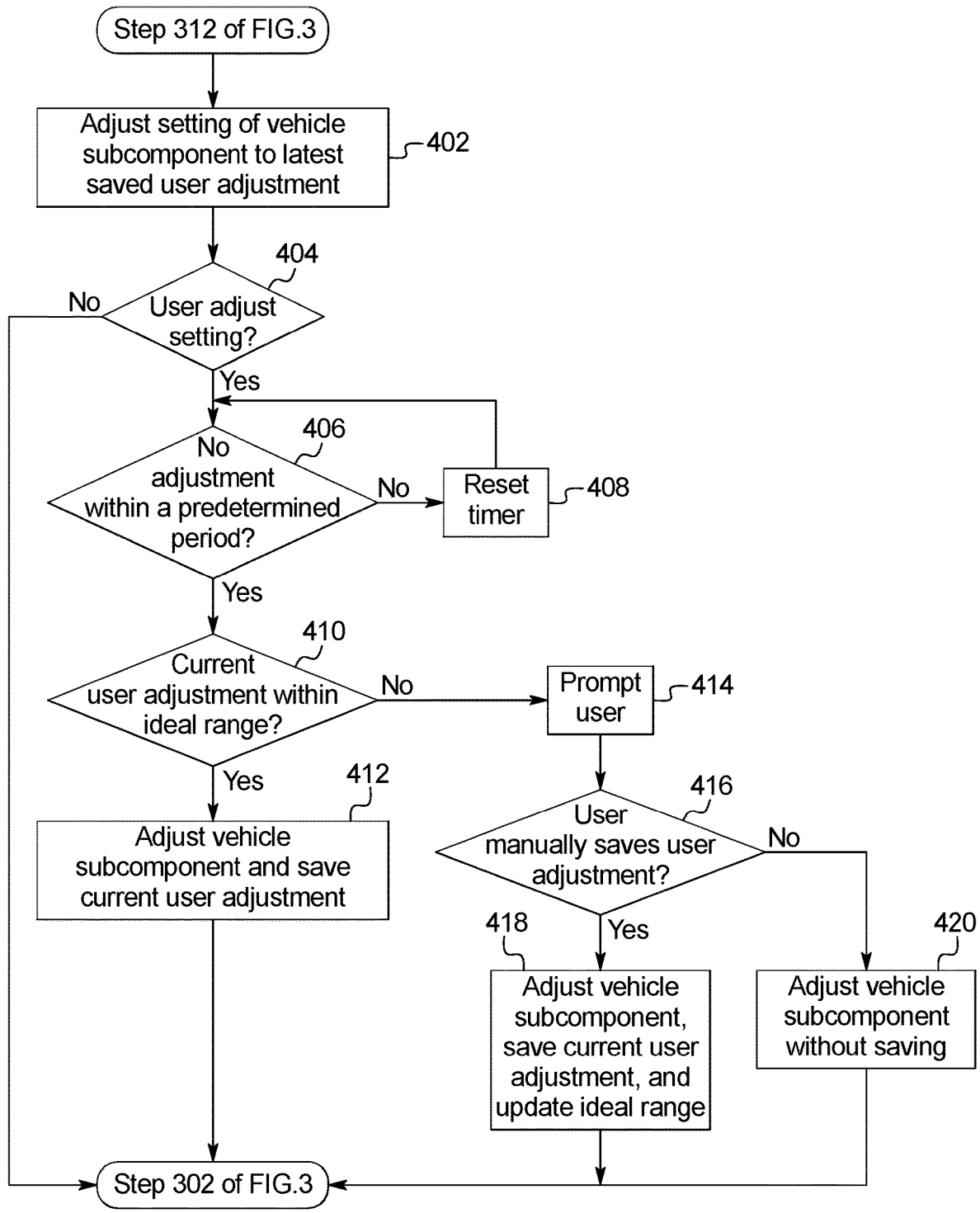
FIG. 4 is a flowchart of a method for operating in an auto-save mode.

FIG. 4 is a flowchart 400 of a method for operating in the auto-save mode. This flowchart may define operations in block 312 of FIG. 3.

Block 402 is a subsequent step from block 308 of FIG. 3. At block 502, based on the user's profile, the auto-save controller 143 adjusts the setting of the vehicle subsystem to the latest saved user adjustment.

At block 404, the auto-save controller 143 determines if the user has adjusted the setting of the vehicle subsystem. If so, the method continues to block 406. Otherwise, the method returns to block 302 of FIG. 3.

At block 406, the auto-save controller 143 determines if no adjustment has been made within a predetermined period. If so, the method continues to block 410. Otherwise, the method continues to block 408.

At block 408, the auto-save controller 143 resets the time of the predetermined period.

At block 410, the auto-save controller 143 determines if the current user adjustment of the setting is within the ideal range. If so, the method continues to block 412. Otherwise, the method continues to block 414.

At block 412, the auto-save controller 143 adjusts the setting of the vehicle subsystem according to the current user adjustment and saves the current user adjustment. Subsequently, the method continues to block 302 of FIG. 3.

At block 414, the auto-save controller 143 causes the infotainment head unit 120 to provide a prompt. The prompt may include a message indicating that the current user adjustment is outside the ideal range.

At block 416, the auto-save controller 143 determines if the user has provided an input to the infotainment head unit 120 to save the current user adjustment. If so, the method continues to block 418. Otherwise, the method continues to block 420.

At block 418, the auto-save controller 143: (1) causes the setting of the vehicle subsystem to adjust according to the user adjustment; (2) saves the current user adjustment; and (3) updates the ideal range by including a value corresponding to the current user adjustment. Subsequently, the method continues to block 302 of FIG. 3.

At block 420, the auto-save controller 143 causes the setting of the vehicle subsystem to adjust according to the user adjustment without saving or updating the ideal range. Subsequently, the method continues to block 302 of FIG. 3.

The flowcharts 300 and 400 of FIGS. 3 and 4 are representative of machine readable instructions stored in memory (such as the memory of FIG. 1) that comprise one or more programs that, when executed by a processor (such as the processor of 1), cause the vehicle 100 to implement the example auto-save controller 143 of FIG. 1. Further, although the example program(s) is/are described with reference to the flowchart illustrated in FIGS. 3 and 4, many other methods of implementing the example auto-save controller 143 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a subsystem; and
    a processor configured to:
    receive two or more inputs indicative of at least one of one or more user adjustments;
    for a user profile, based on the two or more inputs, build a range in which the subsystem has been adjusted over key cycles, wherein the range comprises a set of continuous values that include two or more values associated with one of the at least one of the one or more user adjustments;
    for each instance in which the user profile is loaded, cause the subsystem to adjust to a latest saved user adjustment of the subsystem; and
    responsive to a current user adjustment of the subsystem being within the range, save the current user adjustment.

2. The vehicle of claim 1, wherein the processor is further configured to, responsive to the current user adjustment being outside the ideal range, adjust the subsystem without saving the current user adjustment.

3. The vehicle of claim 1, wherein the processor is further configured to, responsive to the current user adjustment being outside the ideal range and responsive to receiving a user input to save the current user adjustment:
    adjust the subsystem; and
    update the ideal range to include the current user adjustment.

4. The vehicle of claim 3, wherein the processor is further configured to, responsive to the current user adjustment being outside the ideal range and responsive to receiving the user input to save the current user adjustment, save the current user adjustment.

5. The vehicle of claim 1, wherein the processor is further configured to:
    responsive to detecting a user adjustment of the subsystem, run a timer for a predetermined period;
    responsive to detecting additional user adjustment during the predetermined period, reset the timer; and
    responsive to the timer lapsing, determine whether the current user adjustment is within the range.

6. The vehicle of claim 1, wherein the processor is further configured to save the current user adjustment only when the vehicle is parked.

7. The vehicle of claim 1, wherein the subsystem is an adjustable seat.

8. The vehicle of claim 1, wherein the subsystem is an adjustable steering wheel.

9. The vehicle of claim 1, wherein the subsystem is an adjustable head up display (HUD).

10. The vehicle of claim 1, wherein the subsystem is an adjustable mirror, wherein the adjustable mirror is one of a group consisting a side view mirror and a rear view mirror.

11. The vehicle of claim 1, wherein the subsystem is an adjustable pedal, wherein the adjustable pedal is one of a group consisting an acceleration pedal and a braking pedal.

12. The vehicle of claim 1, further comprising antennas, wherein the processor is configured to load the user profile in response to establishing, via the antennas, a wireless communication with a mobile device associated with the user profile.

13. A method of automatically learning and recalling a setting of an adjustable vehicle subsystem, the method comprising:
    receiving two or more inputs indicative of at least one of one or more user adjustments;
    for a user profile, based on the two or more inputs, building a range in which the adjustable vehicle subsystem has been adjusted over key cycles, wherein the range comprises a set of continuous values that include one two or more values associated with one of the at least one of the one or more user adjustments;
    for each instance in which the user profile is loaded, causing the adjustable vehicle subsystem to adjust to a latest saved user adjustment of the adjustable vehicle subsystem; and
    responsive to a current user adjustment of the adjustable vehicle subsystem being within the range, saving the current user adjustment.

14. The method of claim 13, further comprising, responsive to the current user adjustment being outside the ideal range, adjusting the adjustable vehicle subsystem without saving the current user adjustment.

15. The method of claim 13, further comprising, responsive to the current user adjustment being outside the ideal range and responsive to receiving a user input to save the current user adjustment:
    adjusting the adjustable vehicle subsystem; and
    updating the range to include the current user adjustment.

16. The method of claim 15, further comprising, responsive to the current user adjustment being outside the ideal range and responsive to receiving the user input to save the current user adjustment, saving the current user adjustment.

17. The method of claim 13, further comprising:
    responsive to detecting a user adjustment of the adjustable vehicle subsystem, running a timer for a predetermined period;
    responsive to detecting additional user adjustment during the predetermined period, resetting the timer; and
    responsive to the timer lapsing, determining whether the current user adjustment is within the range.

18. The method of claim 13, further comprising saving the current user adjustment only when the vehicle is parked.

19. The method of claim 13, wherein the adjustable vehicle subsystem is an adjustable seat.

20. The method of claim 13, wherein the adjustable vehicle subsystem is an adjustable steering wheel.

21. The method of claim 13, wherein the adjustable vehicle subsystem is an adjustable head up display (HUD).

22. The method of claim 13, wherein the adjustable vehicle subsystem is an adjustable mirror, wherein the adjustable mirror is one of a group consisting a side view mirror and a rear view mirror.

23. The method of claim 13, wherein the adjustable vehicle subsystem is an adjustable pedal, wherein the adjustable pedal is one of a group consisting an acceleration pedal and a braking pedal.

24. The method of claim 13, further comprising loading the user profile in response to establishing, via vehicle antennas, a wireless communication with a mobile device associated with the user profile.

\* \* \* \* \*